Nov. 22, 1932.   G. SIMCOE   1,888,701
REFINED CLAY AND METHOD OF PRODUCING SAME
Original Filed Nov. 9, 1926
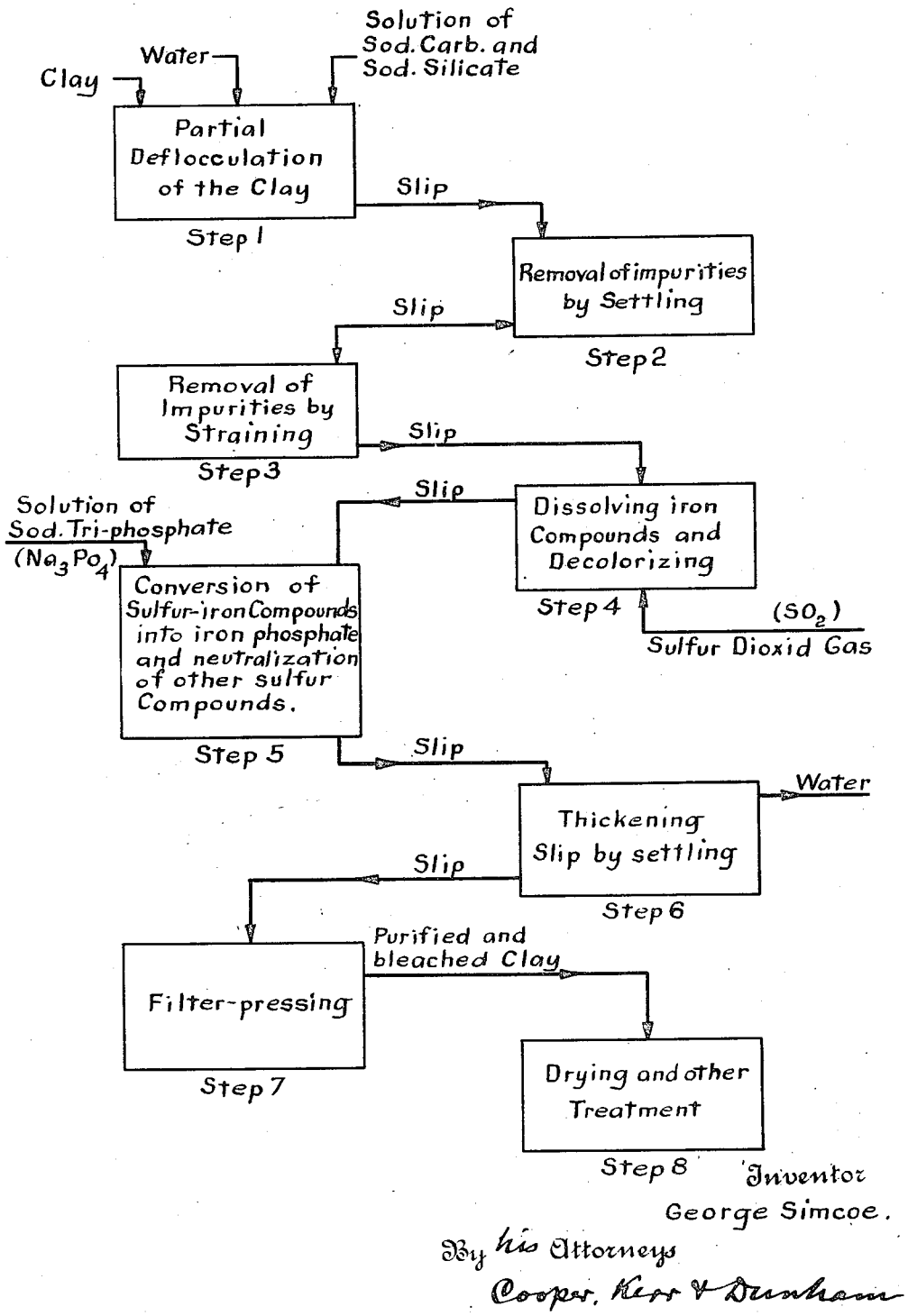

Patented Nov. 22, 1932

1,888,701

UNITED STATES PATENT OFFICE

GEORGE SIMCOE, OF TRENTON, NEW JERSEY, ASSIGNOR TO EDGAR BROTHERS COMPANY, OF METUCHEN, NEW JERSEY, A CORPORATION OF NEW JERSEY

REFINED CLAY AND METHOD OF PRODUCING SAME

Application filed November 9, 1926, Serial No. 147,368. Renewed June 8, 1932.

This invention relates to the refining of clays, and its chief object is to provide a simple, efficient and rapid process of removing stains or color due to the presence of iron and organic materials. To this and other ends the invention comprises the novel features hereinafter described.

When carried out in the preferred way my improved process embraces a number of more or less distinct steps, as indicated in the accompanying drawing, which illustrates the process in the manner of a flow-sheet, but it is to be understood that the invention is not confined to the employment of all the steps there represented or their equivalents, the scope of the invention being determined by the spirit of the appended claims.

In carrying out the invention in the preferred manner the clay to be treated is fed continuously, in the form of small lumps, into a blunger or other suitable mixing apparatus at a more or less constant rate, and is there thoroughly mixed with a deflocculating agent. Various agents suitable for such purposes are known in the prior art, but I prefer to use sodium carbonate and sodium silicate in aqueous solution. It is in general highly desirable and in some cases essential that the deflocculation produced in this step be partial only, and not complete, as I have found that if the deflocculation is carried too far it militates seriously against subsequent gravitative separation of solid impurities. It will be seen that a deflocculating solution which will be suitable in strength and amount for a particular clay may not work well with another, and accordingly such adjustments as these must be left to the judgment and experience of the operator, with due regard to the degree of defloccuation desired. It may be said, however, that with crude clay such as is found in Wilkinson County, Georgia, U. S. A., a solution made up, by weight, of one hundred (100) parts sodium carbonate, one hundred (100) parts sodium silicate, and one thousand (1000) parts water has been found satisfactory. Of this solution, fifty (50) parts are used to two thousand (2000) parts clay and six thousand (6000) parts water in the blunger or mixer, keeping these proportions substantially constant by regulating the supply of clay, water and deflocculating solution. The time required for the desired partial defloccuation depends largely upon such factors as the nature of the clay, the concentration of the deflocculating agent or agents, and the thoroughness of the mixing, and hence no hard and fast rule can be given, but in the example stated, with thorough mixing, I have found that treatment in the blunger for about 18 minutes is sufficient.

From the blunger or mixer the slip or partially deflocculated clay passes continuously into a trough or series of troughs of such length and width (according to the rate of flow of the slip) as to permit the granular impurities to settle out by gravity to the bottom of the troughs, the slip passing on through a lawn or strainer, where floating foreign materials or impurities, such as leaves, seeds, bits of wood, etc., are removed.

The cleaned and partially purified slip is now subjected to a bleaching treatment with a suitable agent, as for example sulfur dioxid in the presence of zinc as a catalyst. This treatment or any equivalent treatment can be conveniently and effectively carried out by passing the slip through a series of bleaching tanks or vats, in which it is subjected to the sulfur dioxid ($SO_2$) in the presence of metallic zinc, which latter may be in the form of paddles or blades constituting rotary agitators. Preferably the slip is pumped into the top of the first tank of the series, passes out by gravity from the bottom of the first into the top of the second, out of the bottom of the second into the top of the third, and so on through the successive tanks and out of the last, which are arranged at successively lower levels for the purpose. At the same time the sulfur dioxid is introduced at the bottom of each tank by means of perforated pipes which are connected in parallel to a suitable manifold connected with a supply of gas, the pipes to the several tanks being equipped with valves so that the supply of gas thereto may be regulated individually to give the desired results, namely, substantially complete solution of the iron compounds carried by the slip, and more or less complete removal of stains of an organic or vegetable nature by the usual bleaching action of sulfur dioxid in the presence of water. The $SO_2$ gas also acts as a flocculating agent and acidifies the slip.

At this stage the iron compounds are for the most part in solution and the organic stains well bleached out, but the slip smells strongly of sulfur compounds, and is too greatly flocculated for convenient filter-pressing. Also, if filter-pressed immediately the iron compounds which remain behind in the filter-cakes appear on the surface of the clay in the form of a yellow scum-like deposit as the water evaporates in drying. I therefore treat the slip, before filter-pressing, to eliminate the undesirable odors and prevent or materially decrease the formation of the aforesaid scum. These results are best attained by treating the slip with a solution of a sodium salt of phosphoric acid, preferably a basic or neutral salt, say tri-sodium phosphate. The solution may be 7 parts of the phosphate in 8 parts water, or therabouts, and is used in such amount as experience with the particular clay indicates for the results desired. The treatment may be conveniently effected by continuously introducing the tri-sodium phosphate solution into the slip as it flows through a trough or pipe from the decolorizing tanks. The phosphate acts to partially re-deflocculate the slip, so to speak, putting it in better condition for filter-pressing, and also eliminates obnoxious odors and prevents the formation of the yellow scum on the press-cake, apparently by converting the iron-sulfur compounds into iron phosphate or the like, which gradually turns slightly bluish. With such treatment the color of the clay approximates the pure white or even bluish white which is so highly desirable in certain industries in which the clay is used. Some or all of the sodium phosphate can be replaced with another alkalin compound, as for example sodium hydroxid or carbonate, preferably the latter. In such case the color is apt to be less pure or even slightly yellowish but for many purposes this is not objectionable.

The slip is next delivered to a settling tank or tanks, where it settles by gravity, permitting the top water to be siphoned off or otherwise withdrawn continuously or at suitable intervals. The slip thus thickened is removed from time to time and filter-pressed to remove as much of the remaining water as possible, and the resulting cakes may then be dried or otherwise treated, say in any manner customary in the art.

I am aware that when the sulfur dioxid is passed through the slip some, at least, of the gas is dissolved in the water present, with the formation of sulfurous acid; and that in all probability it is this acid (part of it being expended in reaction with the sodium carbonate of the deflocculating solution) that effects the conversion of the insoluble iron salts and also bleaches out the organic stains. However, it is convenient to refer to the operation as treatment with sulfur dioxid, since the introduction of sulfur dioxid gas into the slip appears to be the most convenient and economical way of producing the acid; but it is to be understood that if desired the acid may be produced separately and mixed with the slip instead of producing it in the slip itself.

By the treatment described a product free from disagreeable odors can be produced, bluish white in color, and suitable for a wide variety of uses, equal in all respects to the finest clays heretofore available. At the same time the process is economical, as the reagents employed are cheap and are used in relatively small quantities. The process is preferably carried on continuously, in which case such tanks, vats, troughs or the like, has become dirty or fouled in the course of the operation, are duplicated, so that when it is necessary to clean out a receptacle or other device the duplicate can be used without interrupting the process, as will be readily understood.

I have described the preferred way of carrying out my process in actual practice, but I desire it to be understood that the process can be varied without departure from the spirit of the invention as set forth by the appended claims.

I claim—

1. In the art of purifying and decolorizing clay, the improvement comprising subjecting the clay to at least partial deflocculation in the presence of water and removing more or less of the insoluble impurities by gravitative settling to produce a partially purified slip, treating the slip with sulfur dioxid whereby insoluble iron compounds are converted into soluble compounds, organic discoloration is removed, and the slip strongly flocculated, and treating the slip to partially re-deflocculate the same and eliminate sulfur odors.

2. In the art of purifying and decolorizing clay, the improvement comprising subjecting the clay to partial deflocculation in the presence of water and removing more or less of the insoluble impurities by gravitative settling to produce a partially purified slip, treating the slip with an acid reagent whereby insoluble iron compounds are converted into soluble compounds, organic discoloration is removed, and the slip is strongly acidified and flocculated, and treating the slip with a neutralizing reagent to partially re-deflocculate the same and remove obnoxious odors.

3. In the art of purifying and decolorizing clay, the improvement comprising subjecting the clay to partial deflocculation in the presence of water and removing more or less of the insoluble impurities by gravitative settling to produce a partially purified slip, treating the slip to convert insoluble iron compounds into soluble compounds and remove organic discoloration, and treating the slip with sodium phosphate in amount sufficient to materially prevent formation of yellow scum at a later stage but insufficient to cause complete deflocculation.

4. In the art of purifying and decolorizing clay, the improvement comprising treating the clay in the presence of water with a deflocculating agent in amount sufficient to produce only partial deflocculation, and removing more or less granular matter in the clay by settling; and thereafter treating the clay to remove organic and iron discoloration.

5. In the art of purifying and decolorizing clay, the improvement comprising treating the clay in the presence of water with sodium carbonate and sodium silicate to produce partial deflocculation, removing more or less of the insoluble foreign matter in the clay by settling, treating the partially purified clay with sulfur dioxid to change insoluble iron compounds into soluble iron-sulfur compounds and remove organic discoloration; and thereafter treating the clay with tri-sodium phosphate to de-odorize the same and materially prevent formation of yellow scum at a later stage.

6. In the art of purifying and decolorizing clay in which the clay at a suitable stage of the process is treated with sulfur dioxid in the presence of water whereby insoluble iron compounds in the clay are converted into soluble iron-sulfur compounds, the step comprising treating the clay with basic sodium phosplate in amount sufficient to prevent the formation of yellow scum but insufficient to cause complete deflocculation.

7. In the art of purifying and decolorizing clay in which the clay at a suitable stage of the process is treated with sulfur dioxid in the presence of water whereby insoluble iron compounds in the clay are converted into soluble iron-sulfur compounds, the step comprising treating the clay containing such iron-sulfur compounds with tri-sodium phosphate.

8. In the art of purifying and decolorizing clay, the improvement comprising continuously subjecting clay to partial deflocculation, continuously treating the resulting slip to convert insoluble iron compounds into soluble iron-sulfur compounds, and thereafter continuously treating the slip with sodium phosphate.

9. In the art of purifying and decolorizing clay, the improvement comprising continuously mixing clay and a deflocculating solution, continuously treating the resulting slip with sulfur dioxid to convert insoluble iron compounds into soluble iron-sulfur compounds, and thereafter continuously treating the slip with tri-sodium phosphate to convert iron-sulfur compounds into iron phosphate and free the slip from obnoxious odor.

10. In the art of purifying and decolorizing clay, the improvement comprising continuously delivering clay, water and sodium carbonate and sodium silicate to a mixing vessel and mixing the same to partially deflocculate the clay, continuously passing the resulting slip through a settling receptacle at a rate of flow permitting settling out of granular foreign matter, passing the slip continuously from the settling vessel through one or more bleaching vessels in series and simultaneously passing sulfur dioxid gas through the slip in the bleaching vessels to convert insoluble iron compounds into soluble iron-sulfur compounds and bleach organic stains, and continuously passing the bleached slips from the bleaching vessel or vessels to settling receptacles to permit thickening of the slip by settling and while in transit to the settling receptacles treating the slip with tri-sodium phosphate to convert iron-sulfur compounds into iron phosphate and free the slip from obnoxious sulfur odor.

11. In a continuous process of decolorizing clay wherein the slip is treated with sulfur dioxid to convert insoluble iron compounds into soluble iron-sulfur compounds, the step of continuously treating the slip with sodium phosphate after the sulfur dioxid treatment.

12. As a new product, bleached refined clay containing iron phosphate, substantially free from other iron stains, and substantially free from sulfur odors.

13. As a new product, bleached refined clay whitened by the presence of bluish iron phosphate and substantially free from other iron coloration.

14. As a new product, bleached refined clay containing bluish iron phosphate serving to mask any slight yellowish color imparted by other compounds present in the clay.

In testimony whereof I hereto affix my signature.

GEORGE SIMCOE.